(12) United States Patent
Wu et al.

(10) Patent No.: US 10,652,613 B2
(45) Date of Patent: May 12, 2020

(54) SPLICING USER GENERATED CLIPS INTO TARGET MEDIA INFORMATION

(71) Applicant: Tencent Technology (Shenzhen) Company Limited, Shenzhen (CN)

(72) Inventors: Zhenhai Wu, Shenzhen (CN); Bin Fu, Shenzhen (CN); Lingrui Cui, Shenzhen (CN); Qianyi Wang, Shenzhen (CN); Yanggang Dai, Shenzhen (CN); Feng Shi, Shenzhen (CN); Faqiang Wu, Shenzhen (CN)

(73) Assignee: Tencent Technology (Shenzhen) Company Limited, Shenzhen, Guangdong Province (CN)

( * ) Notice: Subject to any disclaimer, the term of this patent is extended or adjusted under 35 U.S.C. 154(b) by 30 days.

(21) Appl. No.: 16/041,585

(22) Filed: Jul. 20, 2018

(65) Prior Publication Data
US 2018/0352293 A1 Dec. 6, 2018

Related U.S. Application Data

(63) Continuation-in-part of application No. PCT/CN2017/074174, filed on Feb. 20, 2017.

(30) Foreign Application Priority Data

Mar. 14, 2016 (CN) .......................... 2016 1 0143913

(51) Int. Cl.
*H04N 21/44* (2011.01)
*G11B 27/031* (2006.01)
(Continued)

(52) U.S. Cl.
CPC ..... *H04N 21/44008* (2013.01); *G11B 27/031* (2013.01); *H04N 21/4302* (2013.01);
(Continued)

(58) Field of Classification Search
None
See application file for complete search history.

(56) References Cited

U.S. PATENT DOCUMENTS 7,123,696 B2 * 10/2006 Lowe ...................... G06F 16/40
379/88.16
7,142,645 B2 * 11/2006 Lowe ................. H04N 7/17318
379/88.16
(Continued)

FOREIGN PATENT DOCUMENTS

CN            1719872 A      1/2006
CN          101051457 A     10/2007
(Continued)

OTHER PUBLICATIONS

Tencent Technology, ISRWO, PCT/CN2017/074174, Mar. 29, 2017, 7 pgs.
(Continued)

*Primary Examiner* — Edward Martello
(74) *Attorney, Agent, or Firm* — Morgan, Lewis & Bockius LLP

(57) ABSTRACT

The present disclosure discloses a media information processing method performed by a media information processing apparatus. The apparatus determines media information clips of target media information and their characteristics, and generates a first media information clip of a first user based on the determined characteristics. Next the apparatus determines media information clips other than the target media information clip in the target media information, and obtains a second media information clip corresponding to the characteristics of the determined media information clips. The apparatus then determines a splicing manner of the media information clips in the target media information, and splices the first media information clip and the second media information clip based on the determined splicing (Continued)

manner. By implementing the present disclosure, a media information clip obtained by a user through photographing and media information obtained by the user through imitation can be efficiently and seamlessly integrated.

17 Claims, 9 Drawing Sheets

(51) Int. Cl.
 *H04N 21/43* (2011.01)
 *H04N 21/845* (2011.01)
(52) U.S. Cl.
 CPC ....... *H04N 21/44* (2013.01); *H04N 21/44016* (2013.01); *H04N 21/8456* (2013.01)

(56) References Cited

U.S. PATENT DOCUMENTS

| | | | | |
|---|---|---|---|---|
| 8,555,169 B2* | 10/2013 | Pendergast | ........... | G11B 27/034 715/716 |
| 2007/0122786 A1* | 5/2007 | Relan | ............ | G09B 19/00 434/308 |
| 2011/0126103 A1* | 5/2011 | Cohen | ............ | G10H 1/365 715/716 |
| 2014/0164507 A1* | 6/2014 | Tesch | ............ | H04L 51/10 709/204 |
| 2015/0281772 A1 | 10/2015 | Zalewski | | |

FOREIGN PATENT DOCUMENTS

| | | |
|---|---|---|
| CN | 101946500 A | 1/2011 |
| CN | 202034042 U | 11/2011 |
| CN | 103916700 A | 7/2014 |
| CN | 103945234 A | 7/2014 |
| CN | 104272753 A | 1/2015 |
| CN | 104376589 A | 2/2015 |
| CN | 104967902 A | 10/2015 |
| CN | 105190699 A | 12/2015 |
| CN | 105812920 A | 7/2016 |
| WO | WO 2009124004 A1 | 10/2009 |

OTHER PUBLICATIONS

Tencent Technology, IPRP, PCT/CN2017/074174, Sep. 18, 2018, 6 pgs.

* cited by examiner

SPLICING USER GENERATED CLIPS INTO TARGET MEDIA INFORMATION

PRIORITY CLAIM AND RELATED APPLICATIONS

This application is a continuation-in-part application of PCT/CN2017/074174, entitled "MEDIA INFORMATION PROCESSING METHOD, MEDIA INFORMATION PROCESSING APPARATUS, AND STORAGE MEDIUM" filed on Feb. 20, 2017, which claims priority to Chinese Patent Application No. 201610143913.8, filed with the State Intellectual Property Office of the People's Republic of China on Mar. 14, 2016, and entitled "MEDIA INFORMATION PROCESSING METHOD, MEDIA INFORMATION PROCESSING APPARATUS, AND STORAGE MEDIUM", all of which are incorporated herein by reference in their entirety.

FIELD OF THE TECHNOLOGY

The present disclosure relates to media information processing technologies, and in particular, to a media information processing method, a media information processing apparatus, and a storage medium.

BACKGROUND OF THE DISCLOSURE

Currently, networks such as the Internet develop quickly, and become important media through which users obtain information and share information. Continuous improvement in network access bandwidth and rapid development of mobile communications make it possible for users to share media information (such as video information or audio information) anytime and anywhere.

Users usually share media information in a plurality of forms. A user performs, by using a device such as using a camera in a mobile terminal device such as a smartphone or a tablet computer, photographing to obtain video information, and locally stores the video information in the device, or shares the video information, for example, shares the video information in a social network or shares the video information with a particular contact.

With the rise of we-media, a user has a requirement of performing imitation performance on conventional media information including clips (or entirety) in off-the-shelf movie and television works such as movies and television series and photographing the imitation performance to obtain a corresponding media information clip, and after performing the photographing to obtain the media information clip, the user processes the media information clip by using professional media editing software, and replaces an original media information clip in the media information with the media information clip obtained through the photographing, to implement fusion of the media information clip obtained by the user through the photographing and the media information.

However, in the related technology, there is no effective solution for how to efficiently and seamlessly integrate a media information clip obtained by a user through photographing and media information obtained by the user through imitation.

SUMMARY

Embodiments of the present disclosure provide a media information processing method, a media information processing apparatus, and a storage medium, so as to efficiently and seamlessly integrate a media information clip obtained by a user through photographing and media information obtained by the user through imitation.

Technical solutions of the embodiments of the present disclosure are implemented as follows:

According to a first aspect of the present disclosure, a media information processing method is performed at an apparatus having one or more processors and memory storing a plurality of programs to be executed by the one or more processors. The apparatus determines media information clips of target media information and their characteristics, and generates a first media information clip of a first user based on the determined characteristics. Next the apparatus determines media information clips other than the target media information clip in the target media information, and obtains a second media information clip corresponding to the characteristics of the determined media information clips. The apparatus then determines a splicing manner of the media information clips in the target media information, and splices the first media information clip and the second media information clip based on the determined splicing manner. By implementing the present disclosure, a media information clip obtained by a user through photographing and media information obtained by the user through imitation can be efficiently and seamlessly integrated.

According to a second aspect of the present disclosure, a media information processing apparatus includes one or more processors, memory coupled to the one or more processors, and a plurality of programs stored in the memory that, when executed by the one or more processors, cause the media information processing apparatus to perform the aforementioned media information processing method.

According to a third aspect of the present disclosure, a non-transitory computer readable storage medium stores a plurality of programs that, when executed by one or more processors of a media information processing apparatus, cause the media information processing apparatus to perform the aforementioned media information processing method.

In the embodiments of the present disclosure, by using a characteristic of a media information clip on which a first user intends to perform performance, the first user is supported to perform imitation performance on a target media information clip, and the first user may perform imitation performance without memorizing all characteristics (such as lines) of the target media information clip; and after the media information clip is determined, based on a characteristic of a media information clip on which the first user does not perform imitation performance, a media information clip that needs to be spliced to the media information clip on which the first user imitates the target media information clip to perform performance is obtained. The entire process does not need to any operation of the first user. The first user only needs to perform imitation performance on the target media information clip, and complete media information may be obtained subsequently, so as to resolve a problem that the complete media information cannot be generated because the first user cannot operate a professional media editing software, thereby improving media information processing efficiency.

DESCRIPTION OF EMBODIMENTS

The following further describes the present disclosure in detail with reference to the accompanying drawings and embodiments. It should be understood that the specific embodiments described herein are merely used to explain the present disclosure but are not intended to limit the present disclosure.

Apparatuses (which are implemented as a first apparatus and a second apparatus in the following specific embodiments) for implementing the embodiments of the present disclosure are first described below.

The apparatuses provided in the embodiments of the present disclosure may be implemented in various manners. For example, all components of the apparatuses are implemented in a mobile terminal device such as a smartphone, a tablet computer, or a notebook computer, or components in the apparatuses are implemented in a coupling manner in the foregoing mobile terminal device and a server side.

Figure 1:
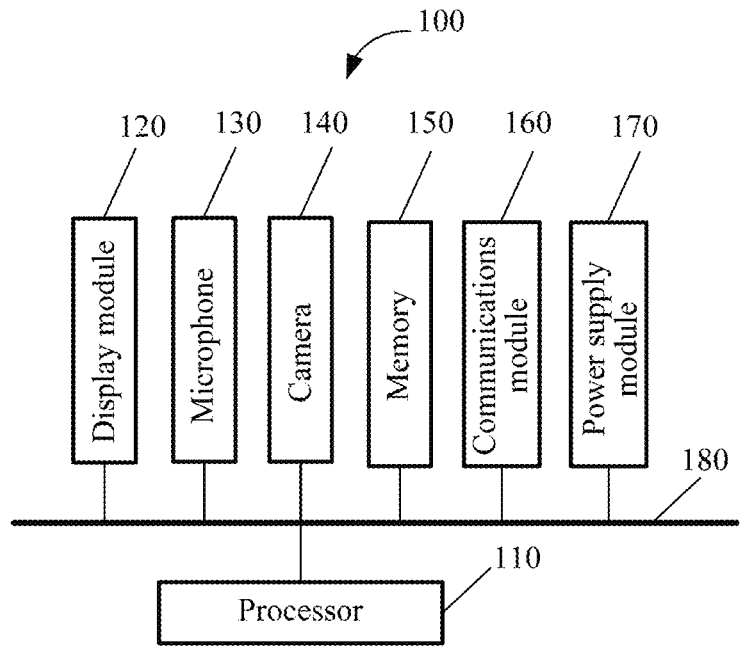
FIG. 1 is a schematic diagram of an optional hardware structure of a first device according to an embodiment of the present disclosure.

An example in which all components of an apparatus are implemented in a mobile terminal device is used. Referring to FIG. 1 that is a schematic diagram of an optional hardware structure of a first apparatus 100 (for a hardware structure of a second apparatus, referring to FIG. 1 to perform implementation), a display module 120 is configured to display information processed by a processor 110 in the first apparatus, such as media information (including a video or an image), a microphone 130 may collect a voice in an audio collection mode and process the voice into audio information that may be processed by the processor 110, a camera 140 may collect an environment in an image collection mode, for example, perform image collection or video collection on a user side (referred to as a first user below, where the first user corresponds to at least one user) of the first apparatus 100, and output video information that may be processed by the processor 110, and a memory 150 is configured to store the audio information output by the microphone 130, and the video information output by the camera 140, and store a result of processing the audio information and the video information by the processor 110. A communications module 160 supports data communication performed between the processor 110 and the server side, such as sends a result of processing media information stored in the memory 150 to a server on a network side, or receives information delivered by the server side, such as media information to be processed by the processor 110, and a power supply module 170 is configured to provide operation power to other modules in the first apparatus 100.

In FIG. 1, the processor 110 transmits commands and data to components in the first apparatus 100 by using a bus 180. Specific implementations of the display module 120, the processor 110, the microphone 130, the camera 140, and the memory 150 in FIG. 1 are not limited. For example, the display module 120 may be implemented as a crystal liquid display module, an organic light emitting diode display module, or the like, the camera 140 may be implemented as a single camera, a dual camera, a 3D camera, or the like, the microphone 130 may be implemented as a single microphone, a dual microphone (including a primary microphone and a noise reduction microphone), or the like, and the memory 150 may be implemented as a flash memory, a read only memory, a transfer apparatus, or the like. The communications module 160 may be implemented as a cellular communications chip, a peripheral module (such as a mobile phone holder or a radio frequency module), and a cellular antenna, and certainly may alternatively be implemented as a wireless fidelity (WiFi) communications chip, a peripheral module (such as a radio frequency module), and a WiFi antenna.

It should be noted that not all modules in the first apparatus 100 shown in FIG. 1 are necessary in an implementation process of implementing this embodiment of the present disclosure. Specifically, part or all of the hardware structure shown in FIG. 1 may be used according to implementation functions of the first apparatus 100 recorded in this embodiment of the present disclosure.

Figure 2:
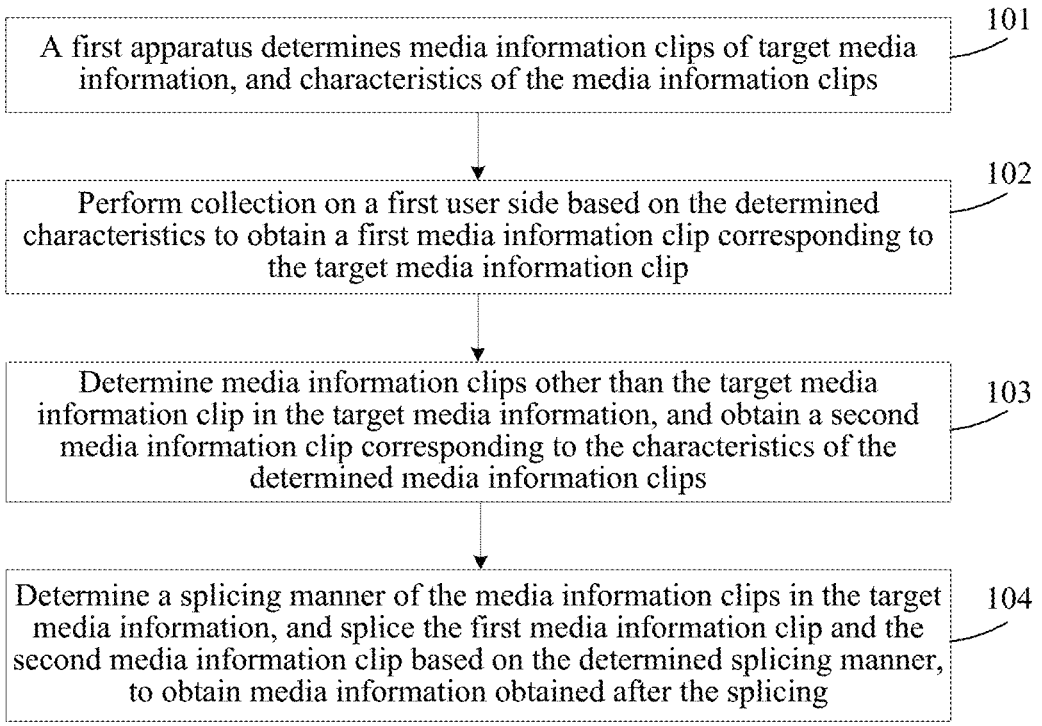
FIG. 2 is a schematic diagram of an optional process of a media information processing method according to an embodiment of the present disclosure.

An embodiment of the present disclosure records a media information processing method. An example in which to-be-processed media information includes video information and audio information is used for description. Referring to FIG. 2, the media information processing method recorded in this embodiment of the present disclosure includes the following steps:

Step 101: A first apparatus determines media information clips of target media information, and characteristics of the media information clips.

In this embodiment of the present disclosure, media information may be stored both locally in the first apparatus and in a database of the server side, to-be-processed media information (that is, target media information) is media information on which a user side of the first apparatus (that is, the first user that includes, for example, a user using the first apparatus, and may further include another user cooperating with the user of the first apparatus to perform performance to imitate the target media information) intends to perform imitation performance, and the first user intends to perform imitation performance on some media information clips of the target media information (certainly, may alternatively perform imitation performance on all media information clips of the target media information).

The media information clips may be determined by dividing the target media information based on the characteristic of the target media information, for example, in the following manners:

manner 1) representing a time length of the target media information based on the characteristic of the target media information, and dividing the target media information into the media information clips based on a time axis; and manner 2) representing character roles carried in the target media information based on the characteristic of the target media information, and extracting media information clips including the character roles from the target media information, to obtain the media information clips, where each of the media information clips carries only one of the character roles, and the carried character roles are different.

The determining the media information clips is described below with reference to the foregoing different division manners.

Manner 1) even (or uneven) division is performed in a division manner based on a time axis, according to a duration time (time length) of the target media information, and in a sequence based on the time axis (including dividing video information and audio information in the target media information, where the video information and the audio information may be obtained from the target media information in advance through separation) to obtain the media information clips, and one media information clip obtained through division includes a video information clip and an audio information clip.

Optionally, when division is performed in a sequence based on the time axis, media information is divided by using stories of the target media information (including corresponding time segments of different stories on the time axis), so as to be more convenient for the first user to select a media information clip on which imitation performance is intended to be performed.

Figure 3:
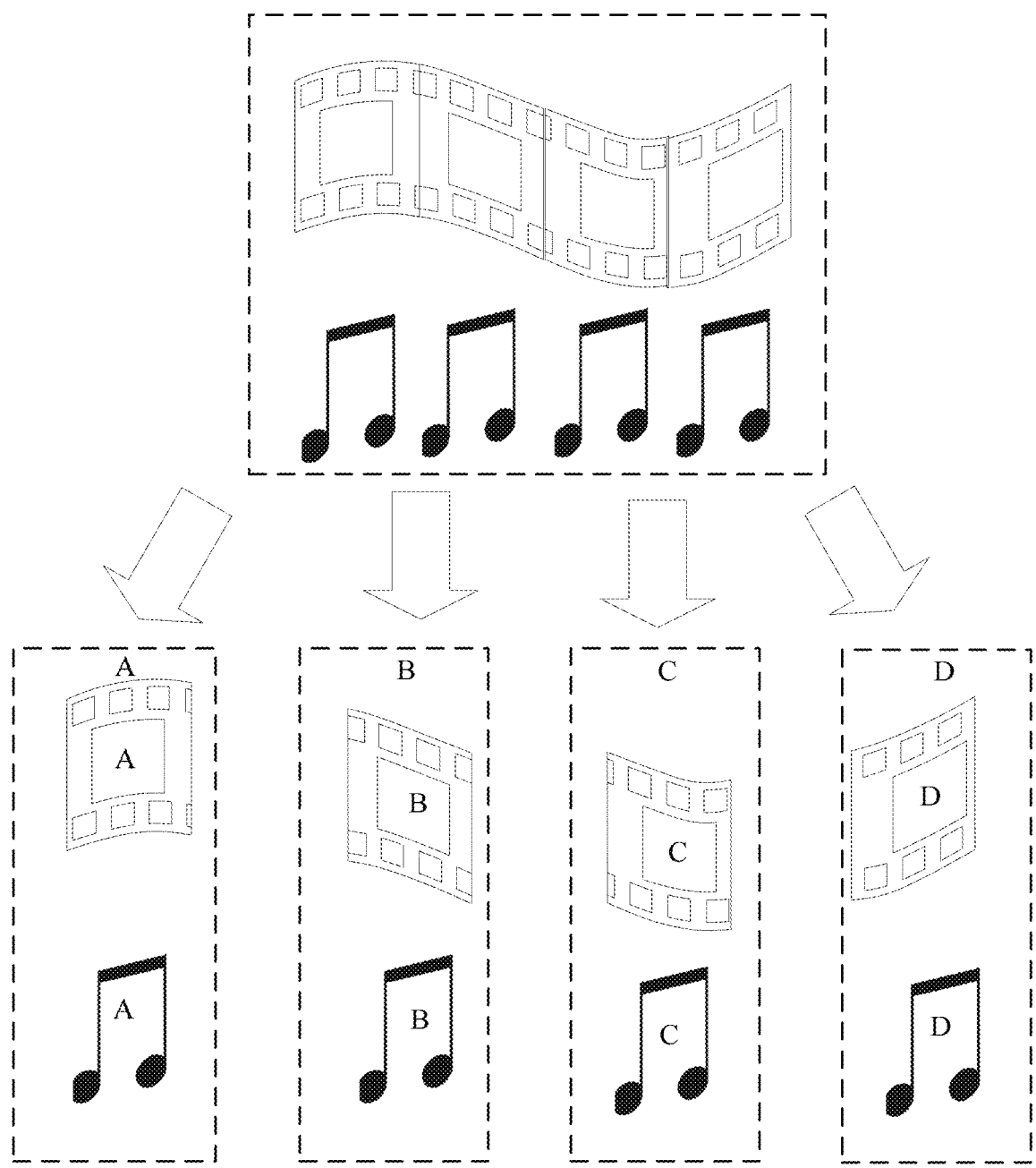
FIG. 3 is a schematic diagram of an optional implementation of media information division according to an embodiment of the present disclosure.

Referring to FIG. 3 that is a schematic diagram of dividing the target media information based on the manner 1), in FIG. 3, the target media information is divided into four media information clips: a media information clip A, a media information clip B, a media information clip C, and a media information clip D, where each media information clip includes a video information clip and an audio information clip. For example, the media information clip A includes a video information clip A and an audio information clip A.

Manner 2) the target media information is divided based on different character roles carried in the target media information, and media information clips (including a video information clip and an audio information clip) only carrying different character roles are sequentially extracted from the target media information.

Figure 4:
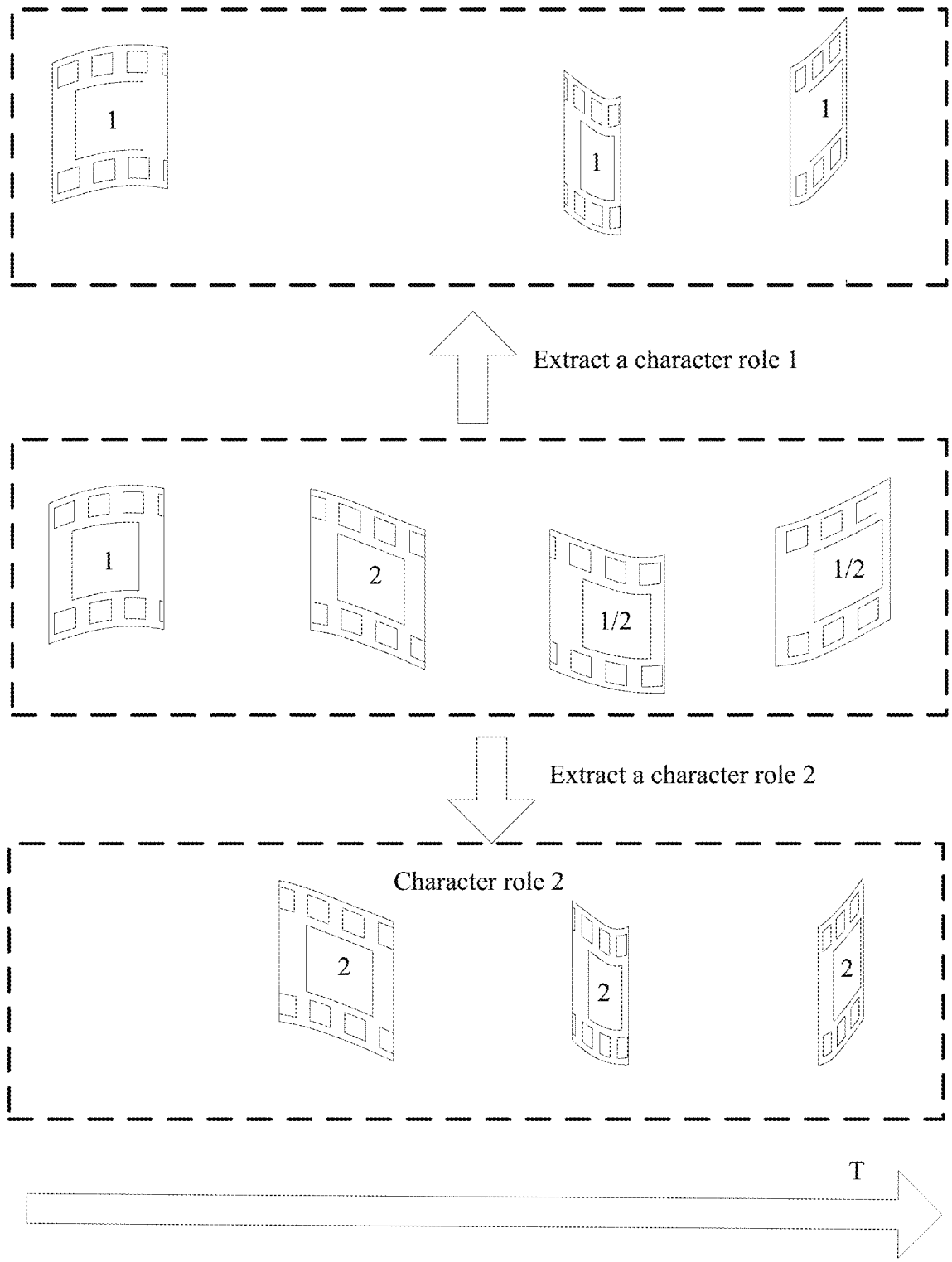
FIG. 4 is a schematic diagram of another optional implementation of media information division according to an embodiment of the present disclosure.

An example in which a video information clip is first extracted from the target media information clip is used. Each frame of image of video information of the target media information is recognized by using an image recognition technology, and character roles carried in each frame of image of the video information are determined (assuming that the video information carries a character role 1 and a character role 2). Referring to FIG. 4, when a media information clip including a target character role (which is set to the character role 1) is extracted, a frame of image only including the character role 1 is directly extracted, while for a frame of image including a plurality of character roles (a frame of image including the character role 1 and the character role 2), a part including the target character role is extracted from the frame of image by using an image recognition technology (such as a face recognition technology or an edge detection technology). In this way, the frame of image extracted from the video information of the target media information only includes the character role 1. Based on a location of the extracted frame of image including the target character role on the time axis, audio information of the target media information is synchronously extracted. In this way, the extracted audio information clip synchronously corresponds to the extracted video information clip on the time axis, and corresponds to the target character role (the character role 1).

In actual application, in addition to dividing the target media information according to the characteristic of the target media information, the first apparatus may further present the characteristic of the target media information, for example, a name of the target media information, a segment story outline, a time length, or a designed task role, which is provided for an instruction used for dividing the target media information and given by the first user, such as an instruction for performing division based on the time axis, or an operation instruction for performing division based on different character roles. The first apparatus responds to a division operation performed by the first user on the media information to obtain the media information clips of the target media information.

After the media information clips included in the target media information are determined, the first apparatus obtains, through analysis, characteristics of the media information clips in the target media information, and the characteristics include at least one of the following: identifiers (serial numbers) of the media information clips, time lengths, character roles related to each sub-clip (one or more frames of images) in the media information clips (the character roles may be represented by using images extracted from the media information clips), and lines of character roles (which may be obtained by performing extraction on an audio information clip by using a speech recognition technology, or directly obtained from the server side).

Step 102: Perform collection on a first user based on the determined characteristics to obtain a first media information clip corresponding to a target media information clip.

Figure 5:
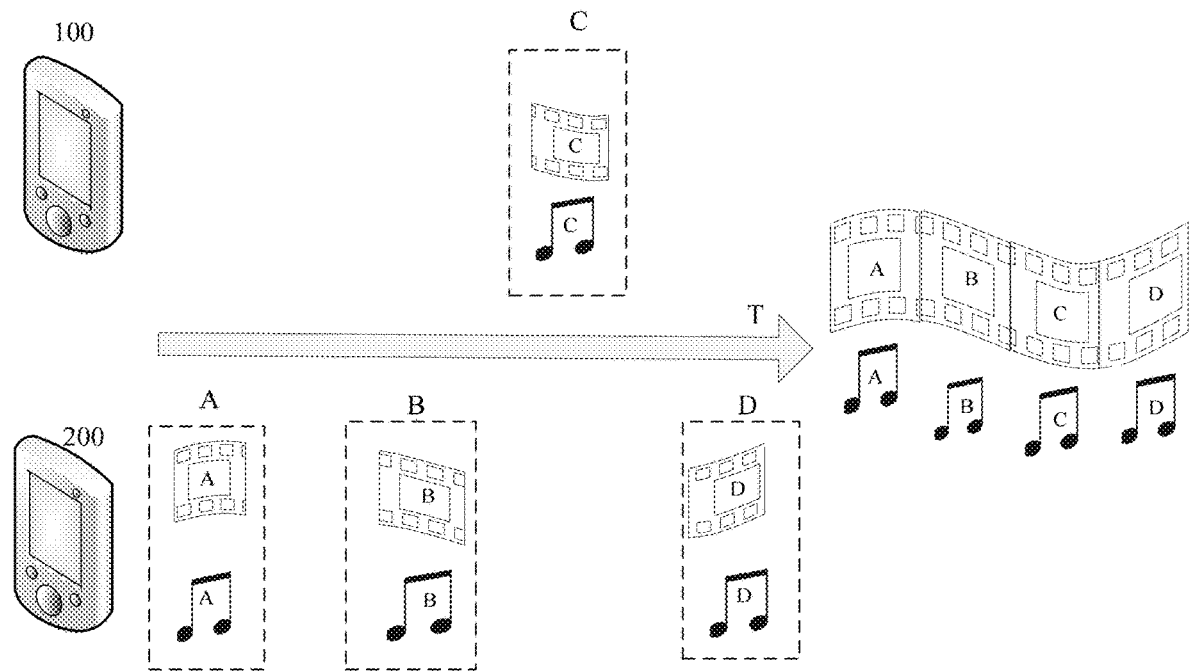
FIG. 5 is a schematic diagram of an optional implementation of media information splicing according to an embodiment of the present disclosure.

Referring to FIG. 5, the first apparatus 100 loads a list of target media information on a graphical interface, so that the first user selects media information on which imitation performance needs to be performed, that is, target media information. After the first user selects the target media information, the first apparatus loads media information clips of the target media information and characteristic of the media information clips, so that the first user continues to select a media information clip on which imitation performance needs to be performed, that is, a target media information clip.

Assuming that after the first apparatus determines that the first user selects the media information clip C, the first apparatus reminds to begin collecting performance performed by the first user for the media information clip C, and stores the performance as target media information C on which the first user performs imitation performance (that is, first media information clips, where the first media information clips are target media information clips on which the first user performs imitation performance, and therefore a quantity of the first media information clips is consistent with a quantity of the target media information clips that are selected by the first user and on which imitation performance is performed). Because the media information clip C may relate to a large quantity of lines, actions, and the like, to improve quality of imitation performance performed by the first user, after reminding to begin collecting performance performed by the first user, the first apparatus may load characteristics of the media information clip C on a graphical interface, and the characteristics include a collection start moment of the media information clip C, a character role carried in the media information clip C, and corresponding lines, so that the first user performs performance based on the reminding characteristics. Meanwhile, the first apparatus performs video collection and audio collection on the first user to correspondingly obtain a video information clip and an audio information clip, and integrates the video information clip and the audio information clip to obtain media information clips on which the first user imitates the media information clip C to perform performance (that is, the first media information clips).

For a case in which the target media information is divided into two media information clips (such as the media information clip A and the media information clip C) or a plurality of media information clips (such as the media information clip A, the media information clip B, and the media information clip C), refer to the record for the media information clip C to perform corresponding implementation. Details are not described herein again.

Step 103: Determine media information clips other than the target media information clip in the target media information, and obtain a second media information clip corresponding to the characteristics of the determined media information clips.

An example in which media information shown in FIG. 2 is target media information is still used. The first user selects the media information clip C as a target media information clip and performs imitation performance on the media information clip C, and the media information further includes the media information clip A, the media information clip B, and the media information clip D, on which the first user does not perform imitation performance. To obtain, based on the media information clip C on which the first user performs imitation performance, complete media information corresponding to the media information shown in FIG. 2, the first apparatus further needs to obtain media information clips corresponding to characteristics of the media information clip A, the media information clip B, and the media information clip D, that is, media information clips (that is, second media information clips) consistent with performance (including task roles, actions, lines, and the like) in the media information clip A, the media information clip B, and the media information clip D.

In an implementation, the first apparatus may directly splice the original media information clip A, media information clip B, and media information clip D of the target media information shown in FIG. 2 and the media information clip C on which the first user performs imitation performance.

In another implementation, it is considered that another apparatus (a second apparatus is used as an example below) may also perform collection on a corresponding user side for the media information clip A, the media information clip B, and the media information clip D to obtain a media information clip on which imitation performance is performed, such as, a media information clip obtained by the second apparatus by collecting performance on a second user side based on characteristics of media information clips (including the media information clip A, the media information clip B, and the media information clip D) other than the media information clip C of the media information clips. In this way, the media information clip C on which the first user performs imitation performance may be spliced to the media information clip A, the media information clip B, and the media information clip D on which the second user side performs imitation performance.

In actual application, media information clips on which imitation performance is performed and that are collected by another apparatus on a corresponding user side may relate to a plurality of pieces of media information (that is, not only including the foregoing target media information). Therefore, for the media information clips collected by the another apparatus on the corresponding user side, media information clips on which performance is performed after a target media information clip in the target media information is imitated need to be determined. For example, media information clips collected by the second apparatus on the second user side are obtained, matching is performed between characteristics of the media information clips collected by the second apparatus, and characteristics of the media information clip A, the media information clip B, and the media information clip D in the target media information (that is, characteristics of media information clips other than the target media information clip in the target media information). For example, matching is performed between identifiers of the media information clips (such as serial numbers or names uniquely representing the media information clips), and a media information clip that is collected by the second apparatus and on which matching is performed successfully is used as a second media information clip.

Step 104: Determine a splicing manner of the media information clips in the target media information, and splice the first media information clip and the second media information clip based on the determined splicing manner, to obtain media information obtained after the splicing.

FIG. 2 is used as an example. The target media information is divided in a manner based on the time axis, and the first apparatus collects a media information clip (that is, the first media information clip) on which performance is performed by the first user for the media information clip C. Therefore, when the media information clip C on which imitation performance is performed by the first user is spliced to the media information clip A, the media information clip B, and the media information clip D (as described above, the media information clip A, the media information clip B, and the media information clip D herein may be media information clips in the target media information shown in FIG. 2, or may be media information clips that are collected by another apparatus such as a second apparatus 200 shown in FIG. 5 and on which the second user side imitates the media information clip A, the media information clip B, and the media information clip D in the target media information to perform performance), referring to FIG. 5, the first apparatus 100 sequentially splices the media information clip C, the media information clip A, the media information clip B, and the media information clip D based on a sequence on the time axis (the sequence is sequentially the media information clip A, the media information clip B, the media information clip C, and the media information clip D) in a sequential splicing manner based on the time axis.

Figure 6:
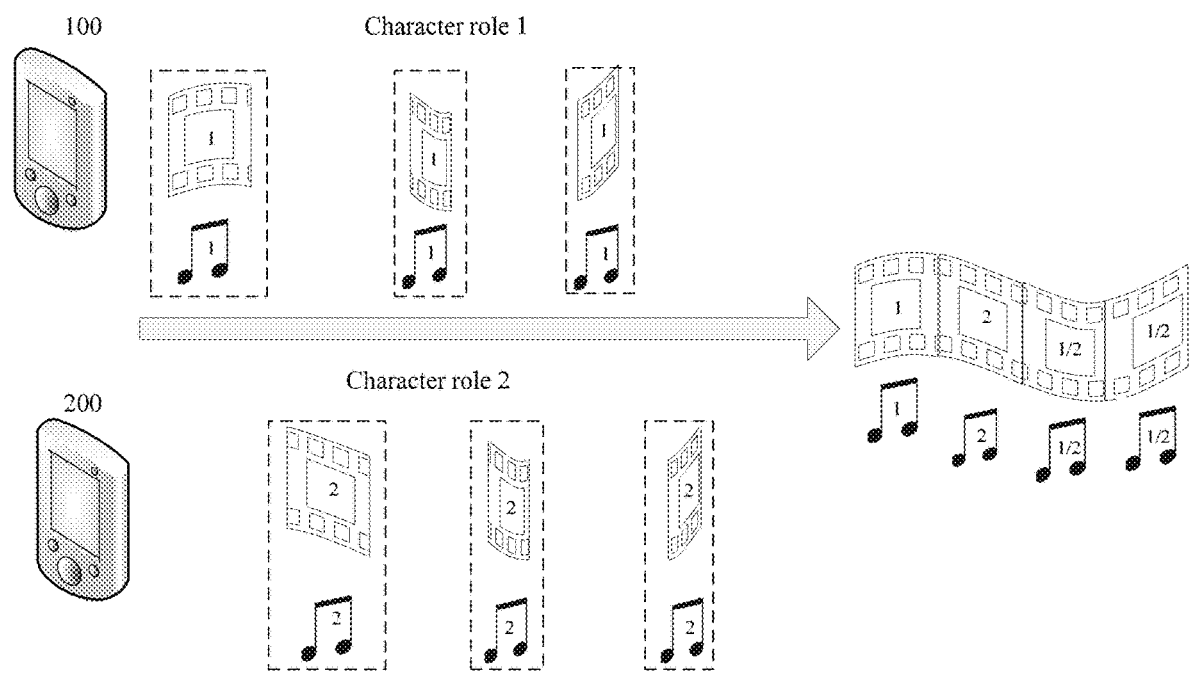
FIG. 6 is a schematic diagram of another optional implementation of media information splicing according to an embodiment of the present disclosure.

FIG. 4 is then used as an example. When the first apparatus divides the target media information based on different character roles carried in the target media information, if the first apparatus determines, according to an operation instruction of the first user, that the target media information on which the first user intends to perform imitation performance includes a media information clip of a character role 1, characteristics of the media information clip of the character role 1 (such as a start time, an ends time, lines at different time points, and an action reminder) are loaded, and collection (including video collection and audio collection) is performed on performance performed on a media information clip of a task role 1 imitated by the first user, to obtain the media information clip on which the first user imitates the task role 1 to perform performance. Here, a synchronous splicing manner is used. Referring to FIG. 6, the first apparatus 100 synchronously splices the media information clip on which the first user imitates the task role 1 to perform performance (that is, the first media information clip) and a media information clip including a character role 2 (that is, a second media information clip, which may be a media information clip extracted from the target media information shown in FIG. 4 based on the character role 2, or may be a media information clip that is collected by another apparatus such as the second apparatus 200 shown in FIG. 6 and on which the second user side imitates the media information clip of the character role 2 to perform performance) based on an extraction location of the carried character role in the target media information.

As described in step 101, the media information clips are determined by dividing the target media information based on the characteristic of the target media information. That is, when the first apparatus divides the target media information, original data of the target media information does not need to be locally stored. For this case, when the first apparatus determines the target media information clip in the media information clips of the target media information, and performs collection for the target media information clip on which the first user performs imitation performance, to improve processing efficiency of subsequently splicing media information clips, referring to FIG. 7, the first apparatus 100 synchronously obtains, in a collection process, media information clips in the target media information on which the first user does not perform imitation performance. For example, the media information clips may be the media information clip A, the media information clip B, the media information clip D in the target media information (that is, the media information clips other than the target media information clip in the target media information), or may be media information clips on which another apparatus such as the second apparatus 200 imitates the media information clip A, the media information clip B, the media information clip D (that is, the media information clips other than the target media information clip in the target media information) for the second user side to perform performance.

Figure 8:
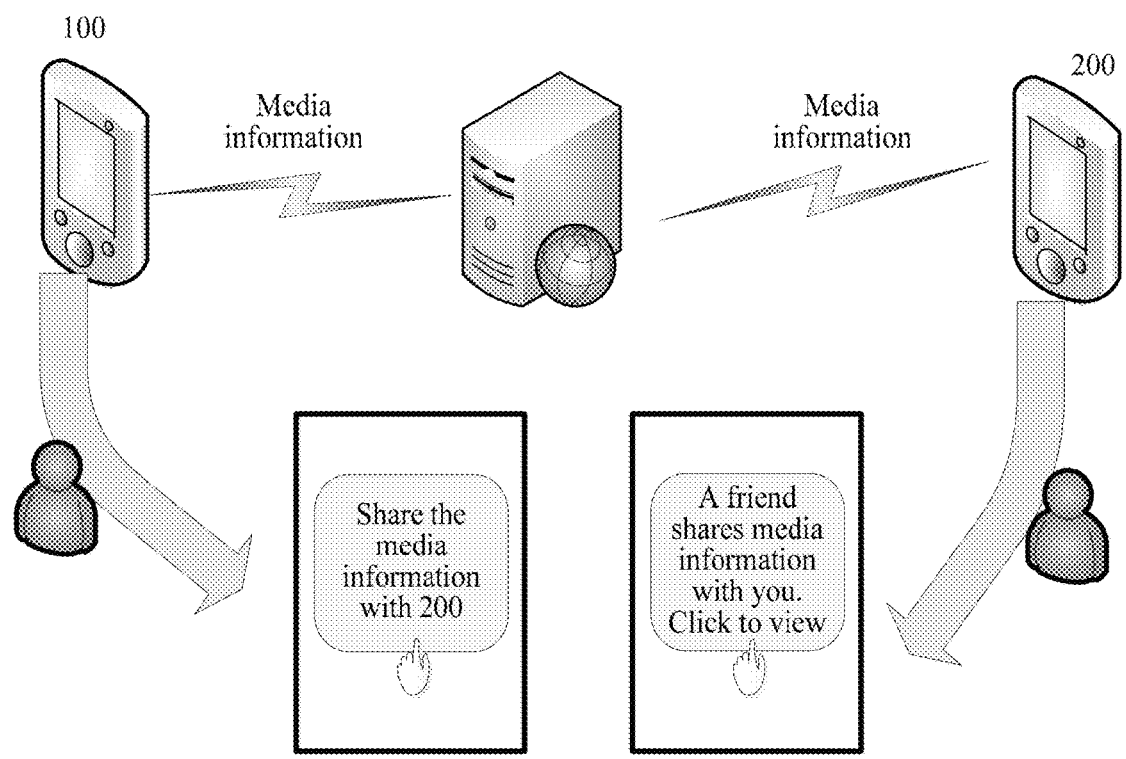
FIG. 8 is a schematic diagram of a scenario of sharing media information obtained after splicing according to an embodiment of the present disclosure.

The media information obtained through the splicing includes the performance performed by the first user. Therefore, in actual application, the first user has a requirement of uploading and sharing the media information obtained through the splicing. A relatively common scenario is that, referring to FIG. 8, when the first apparatus 100 (which may be disposed in various terminals such as a smartphone) obtains media information clips in the target media information on which the first user does not perform performance, first the server side (used to bear a social function between different user sides) queries whether a user side having a social relationship with the first user uploads a corresponding media information clip. Certainly, according to actual needs, the first apparatus supports selecting different media information clips uploaded by the second user side, and performs splicing according to media information clips returned by the server side. After media information is uploaded to the server side, a shared link returned by the server side may be obtained. Sharing in a form of a uniform resource locator (URL) may be performed based on the shared link, a receiving party such as the second apparatus 200 may access the media information based on the URL, or perform sharing on an HTML5 page based on the link, and a page visitor may watch the media information by clicking the link.

In this embodiment of the present disclosure, by using a characteristic of a media information clip on which a first user intends to perform performance, the first user is supported to perform imitation performance on a target media information clip, and the first user may perform imitation performance without memorizing all characteristics (such as lines) of the target media information clip; and after the media information clip is determined, based on a characteristic of a media information clip on which the first user does not perform imitation performance, a media information clip that needs to be spliced to the media information clip on which the first user imitates the target media information clip to perform performance is obtained. The entire process does not need to any operation of the first user. The first user only needs to perform imitation performance on the target media information clip, and complete media information may be obtained subsequently, so as to resolve a problem that the complete media information cannot be generated because the first user cannot operate a professional media editing software, thereby improving media information processing efficiency.

In the foregoing record of this embodiment of the present disclosure, at the same time of collecting the media information clips on which the first user imitates the target media information clip to perform performance, video collection and audio collection are performed; and the first user further has such a requirement that, the first user only imitates action gestures in the target media information clip to perform performance, but does not perform performance on lines in the target media information clip, and it is intended that the first apparatus collects a media information clip that the first user performs performance to generate and that includes an image of the target media information clip on which the first user performs imitation performance, and uses original audio information in the target media information and corresponding to the target media information clip. In this embodiment of the present disclosure, processing for this case is described.

Figure 9:
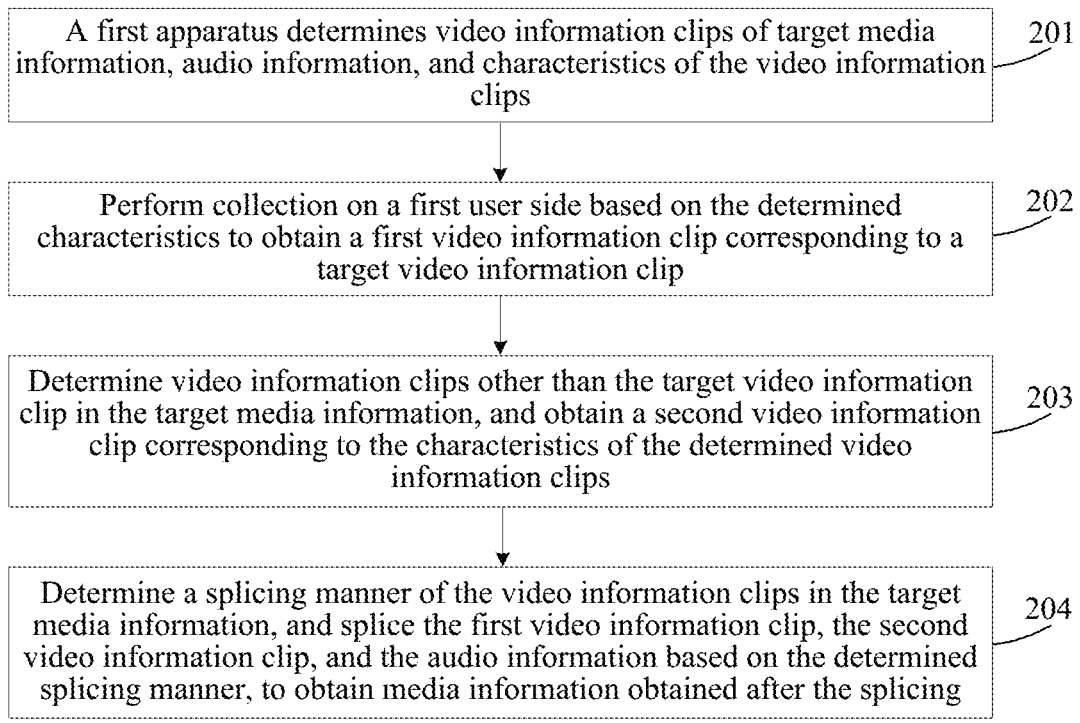
FIG. 9 is a schematic diagram of another optional process of a media information processing method according to an embodiment of the present disclosure.

Referring to FIG. 9, a media information processing method recorded in an embodiment of the present disclosure includes the following steps:

Step 201: A first apparatus determines video information clips of target media information, audio information, and characteristics of the video information clips.

Determining a video information clip is described below with reference to the foregoing different division manners, which is different from the determining a media information clip in the foregoing record in the embodiment of the present disclosure in that, because the first apparatus does not collect audio information of the first user but uses original audio information of the target media information, video information and audio information may be first separated from the target media information; and the video information is divided into video information clips, but the audio information is not processed.

Manner 3) even (or uneven) division is performed (only on the video information in the target media information) in a division manner based on a time axis, according to a duration time (time length) of the target media information, and in a sequence based on the time axis to obtain video information clips.

Optionally, when division is performed in a sequence based on the time axis, the video information in the media information is divided by using stories of the target media information (including corresponding time segments of different stories on the time axis) to obtain video information clips, and the audio information is not processed, so as to be more convenient for the first user to select a video information clip on which imitation performance is intended to be performed.

Figure 10:
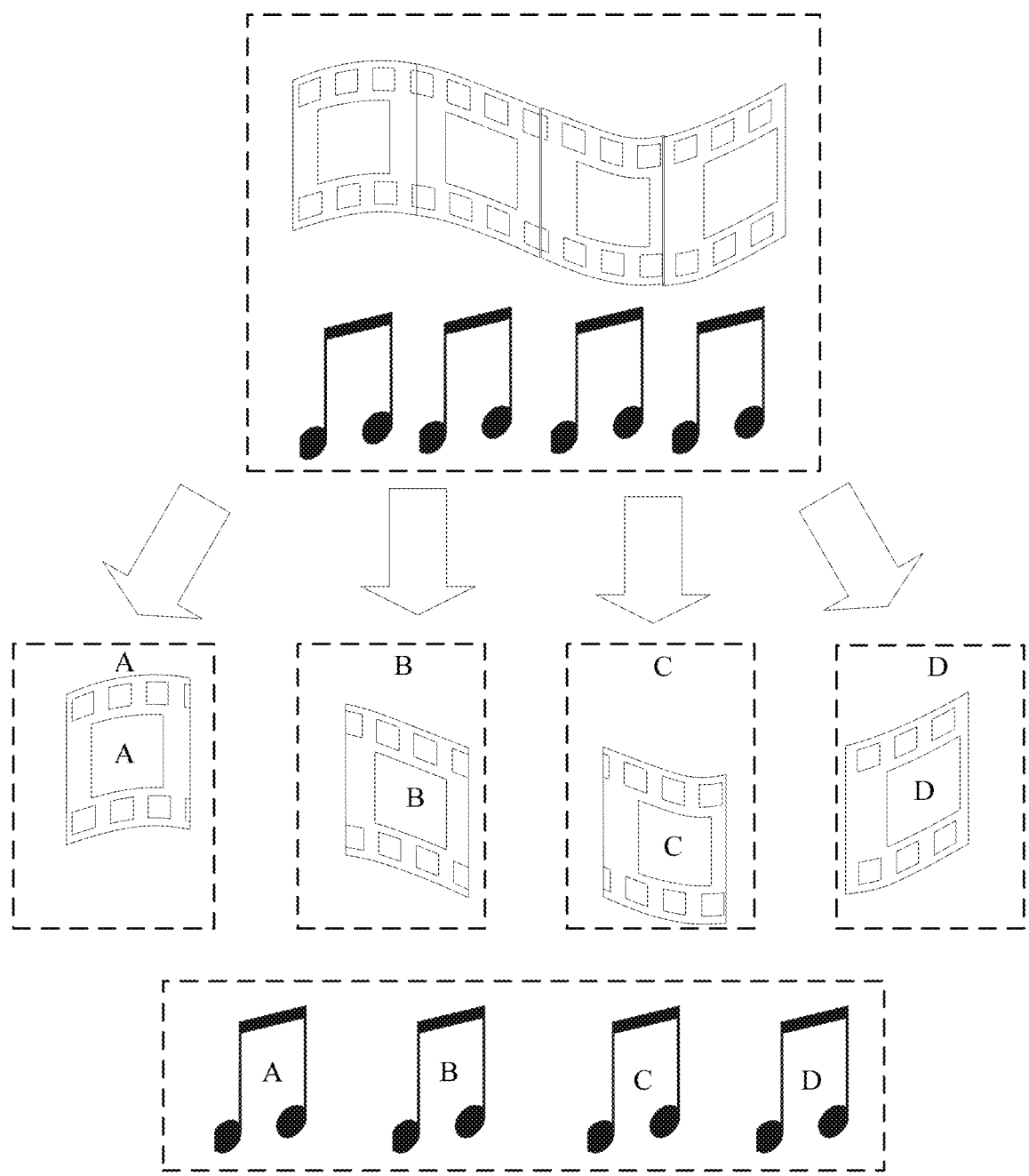
FIG. 10 is a schematic diagram of another optional implementation of media information division according to an embodiment of the present disclosure.

Referring to FIG. 10 that is a schematic diagram of dividing target media information based on manner 1). In FIG. 10, the target media information is divided into four video information clips: a video information clip A, a video information clip B, a video information clip C, and a video information clip D, and after audio information in the target media information is separated from video information, the audio information is not divided.

Manner 4) video information and audio information are separated from the target media information, the video information is divided based on different character roles carried in the video information, only video information clips carrying different character roles are sequentially extracted from the video information of the target media information, and after the audio information in the target media information is separated from the video information, the audio information is not divided.

For example, each frame of image of the video information in the target media information is recognized by using an image recognition technology, and a character role carried in each frame of image of the video information is determined (assuming that the video information carries a character role 1 and a character role 2). Referring to FIG. 4, when a video information clip including a target character role (which is set to the character role 1) is extracted, a frame of image only including the character role 1 is directly extracted, while for a frame of image including a plurality of character roles (a frame of image including the character role 1 and the character role 2), a part including the target character role is extracted from the frame of image by using an image recognition technology (such as a face recognition technology or an edge detection technology). In this way, the frame of image extracted from the video information of the target media information only includes the character role 1.

Step 202: Perform collection on a first user based on the determined characteristics to obtain a first video information clip corresponding to a target video information clip.

Referring to FIG. 5, the first apparatus loads a list of target media information on a graphical interface, so that the first user selects video information on which imitation performance needs to be performed, that is, target video information. After the first user selects the target video information, the first apparatus loads video information clips of the target video information and characteristic of the video information clips, so that the first user continues to select a video information clip on which imitation performance needs to be performed, that is, a target video information clip.

For example, assuming that after the first apparatus determines that the first user selects the video information clip C, the first apparatus reminds to begin collecting performance performed by the first user for the video information clip C, and stores the performance as target media information C on which the first user performs imitation performance (that is, first video information clips, where the first video information clips are target video information clips on which the first user performs imitation performance, and therefore a quantity of the first video information clips is consistent with a quantity of the target video information clips that are selected by the first user and on which imitation performance is performed). Because the video information clip C may relate to a large quantity of actions and the like, to improve quality of imitation performance performed by the first user, after reminding to begin collecting performance performed by the first user, the first apparatus may load characteristics of the video information clip C on a graphical interface, and the characteristics include a collection start moment and a collection end moment of the video information clip C, a character role carried in the video information clip C, corresponding action reminders, and the like, so that the first user performs performance based on the reminding characteristics. Meanwhile, the first apparatus performs video collection on the first user, to obtain video information clips on which the first user imitates the video information clip C to perform performance (that is, the first video information clips).

For a case in which the target media information is divided into two video information clips (such as the video information clip A and the video information clip C) or a plurality of video information clips (such as the video information clip A, the video information clip B, and the video information clip C), refer to the record for the video information clip C to perform corresponding implementation. Details are not described herein again.

Step 203: Determine video information clips other than the target video information clip in the target media information, and obtain a second video information clip corresponding to the characteristics of the determined video information clips.

An example in which media information shown in FIG. 10 is target media information is still used. The first user selects the video information clip C in the media information as a target video information clip and performs imitation performance on the video information clip C, and the target media information further includes the video information clip A, the video information clip B, and the video information clip D, on which the first user does not perform imitation performance. To obtain, based on the video information clip C on which the first user performs imitation performance, complete media information corresponding to the media information shown in FIG. 10, the first apparatus further needs to obtain video information clips corresponding to characteristics of the video information clip A, the video information clip B, and the video information clip D, that is, video information clips (that is, second video information clips) consistent with performance (including task roles, actions, lines, and the like) in the video information clip A, the video information clip B, and the video information clip D.

In an implementation of video splicing, the first apparatus may directly splice the original video information clip A, video information clip B, and video information clip D of the target media information shown in FIG. 10 and the video information clip C on which the first user performs imitation performance.

In another implementation of video splicing, it is considered that another apparatus (a second apparatus is used as an example below) may also perform collection on a corresponding user side for the video information clip A, the video information clip B, and the video information clip D to obtain a video information clip on which imitation performance is performed, such as, a video information clip obtained by the second apparatus by collecting performance on a second user side based on characteristics of video information clips (including the video information clip A, the video information clip B, and the video information clip D) other than the video information clip C of the video information clips. In this way, the video information clip C on which the first user performs imitation performance may be spliced to the video information clip A, the video information clip B, and the video information clip D on which the second user side performs imitation performance, and the audio information in the target media information.

In actual application, video information clips on which imitation performance is performed and that are collected by another apparatus on a corresponding user side may relate to a plurality of pieces of media information (that is, not only including the foregoing target media information). Therefore, for the video information clips collected by the another apparatus on the corresponding user side, video information clips on which performance is performed after a target video information clip in the target media information is imitated need to be determined.

For example, video information clips collected by the second apparatus on the second user side are obtained, matching is performed between characteristics of the video information clips collected by the second apparatus, and characteristics of the video information clip A, the video information clip B, and the video information clip D in the target media information (that is, characteristics of video information clips other than the target video information clip in the target media information). For example, matching is performed between identifiers of the video information clips (such as serial numbers or names uniquely representing the video information clips), and a video information clip that is collected by the second apparatus and on which matching is performed successfully is used as a second video information clip.

Step 204: Determine a splicing manner of the video information clips in the target media information, and splice the first video information clip, the second video information clip, and the audio information based on the determined splicing manner, to obtain media information obtained after the splicing.

Figure 11:
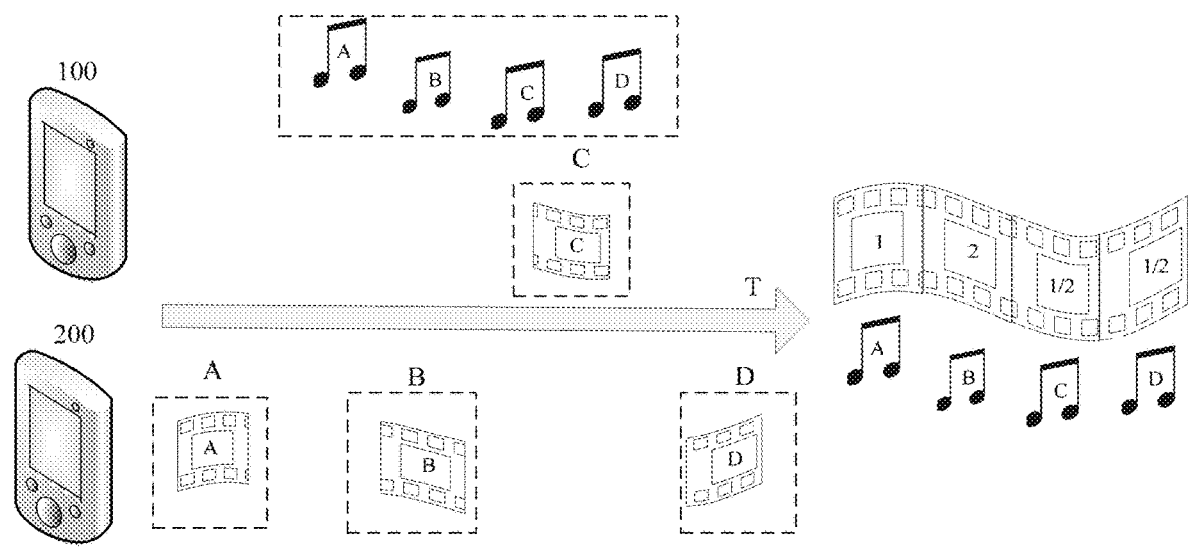
FIG. 11 is a schematic diagram of still another optional implementation of media information splicing according to an embodiment of the present disclosure.

FIG. 10 is used as an example. The target media information is divided in a manner based on the time axis, and the first apparatus collects a video information clip (that is, the first video information clip) on which performance is performed by the first user for the video information clip C. Therefore, when the video information clip C on which imitation performance is performed by the first user is spliced to the video information clip A, the video information clip B, and the video information clip D (as described above, the video information clip A, the video information clip B, and the video information clip D herein may be video information clips in the target media information shown in FIG. 10, or may be video information clips that are collected by another apparatus such as a second apparatus 200 shown in FIG. 11 and on which the second user side imitates the video information clip A, the video information clip B, and the video information clip D in the target media information to perform performance), and the audio information, referring to FIG. 11, the first apparatus 100 sequentially splices the video information clip C, the video information clip A, the video information clip B, the video information clip D, and the audio information based on a sequence on the time axis (the sequence is sequentially the video information clip A, the video information clip B, the video information clip C, and the video information clip D) in a sequential splicing manner based on the time axis.

FIG. 4 is used as an example. When the first apparatus divides the target media information based on different character roles carried in the target media information, if the first apparatus determines, according to an operation instruction of the first user, that the target media information on which the first user intends to perform imitation performance includes a video information clip of a character role 1, characteristics of the video information clip of the character role 1 (such as a start time, an ends time, and an action reminder) are loaded, and collection (only video collection) is performed on performance performed on a video information clip of a task role 1 imitated by the first user, to obtain the video information clip on which the first user imitates the task role 1 to perform performance.

Figure 12:
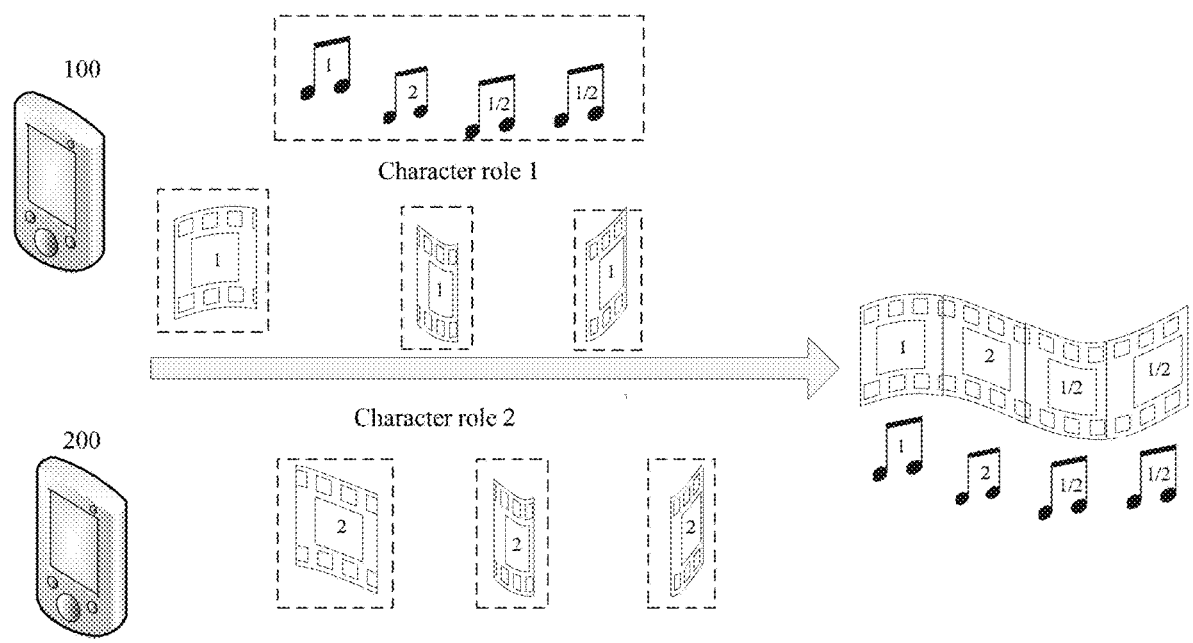
FIG. 12 is a schematic diagram of still another optional implementation of media information splicing according to an embodiment of the present disclosure.

Here, a synchronous splicing manner is used. Referring to FIG. 12, the first apparatus 100 synchronously splices the video information clip on which the first user imitates the task role 1 to perform performance (that is, the first video information clip) and a video information clip including a character role 2 (that is, a second video information clip, which may be a video information clip extracted from the target media information shown in FIG. 4 based on the character role 2, or may be a video information clip that is collected by another apparatus such as the second apparatus 200 shown in FIG. 12 and on which the second user side imitates the video information clip of the character role 2 to perform performance) based on an extraction location of the carried character role in the target media information.

As described in step 201, the video information clips are determined by dividing the video information in the target media information based on the characteristic of the target media information. That is, when the first apparatus divides the target media information, original data of the target media information does not need to be locally stored.

Figure 7:
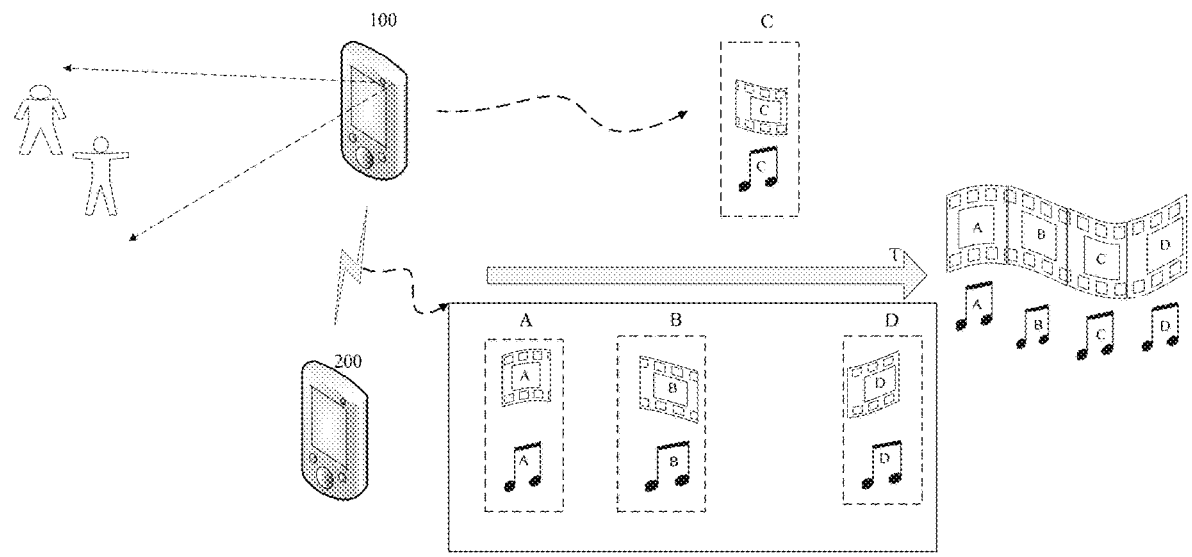
FIG. 7 is a schematic diagram of synchronously collecting a first media information clip and obtaining a second media information clip according to an embodiment of the present disclosure.

For this case, when the first apparatus determines the target video information clip in the video information clips of the target media information, and performs collection for the target video information clip on which the first user performs imitation performance, to improve processing efficiency of subsequently splicing media information clips, referring to FIG. 7, the first apparatus synchronously obtains, in a collection process, video information clips in the target media information on which the first user does not perform imitation performance. For example, the video information clips may be the video information clip A, the video information clip B, the video information clip D in the target media information (that is, the video information clips other than the target media information clip in the target media information), or may be video information clips on which another apparatus such as the second apparatus 200 imitates the video information clip A, the video information clip B, the video information clip D (that is, the video information clips other than the target video information clip in the target media information) for the second user side to perform performance.

For example, the media information obtained through the splicing includes the performance performed by the first user. Therefore, in actual application, the first user has a requirement of uploading and sharing the media information obtained through the splicing. A relatively common scenario is that, when the first apparatus obtains video information clips in the target media information on which the first user does not perform performance, first the server side (used to bear a social function between different user sides) queries whether a user side having a social relationship with the first user uploads a corresponding video information clip. Certainly, according to actual needs, the first apparatus supports selecting different video information clips uploaded by the second user side, and performs splicing according to video information clips returned by the server side. After media information is uploaded to the server side, a shared link returned by the server side may be obtained. Sharing in a form of a URL may be performed based on the shared link, a receiving party may access the media information based on the URL, or perform sharing on an HTML5 page based on the link, and a page visitor may watch the media information by clicking the link.

Figure 13:
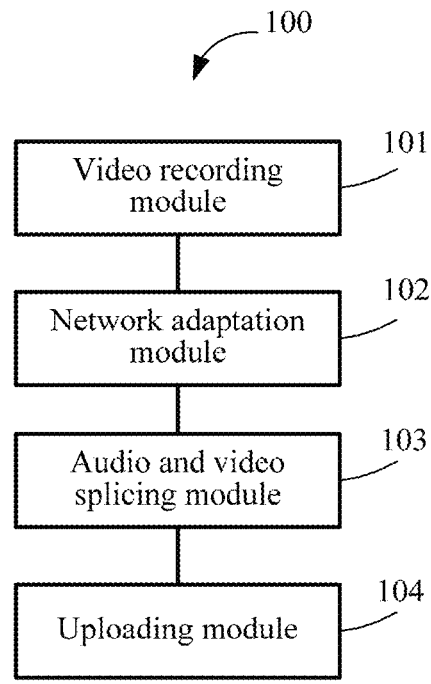
FIG. 13 is a schematic diagram of an optional system structure of a media information processing apparatus according to an embodiment of the present disclosure.

In an embodiment of the present disclosure, a system architecture for a media information processing apparatus is described. Referring to a schematic diagram of an optional system architecture of a media information processing apparatus 100 shown in FIG. 13, the media information processing apparatus 100 includes:

a video recording module 101, a network adaptation module 102, an audio and video splicing module 103, and an uploading module 104. Modules in the system architecture shown in FIG. 13 are obtained by dividing functions of the media information processing apparatus on the level of logical function modules, and a hardware structure of the media information processing apparatus has corresponding hardware to support the modules. For example, the video recording module 101 may be implemented by at least the camera 140 shown in FIG. 1, the network adaptation module 102 may be implemented at least by means of cooperation between the processor 110 and the communications module 160 in FIG. 1, and the audio and video splicing module 103 may be implemented by at least the processor 110 shown in FIG. 1.

In this embodiment of the present disclosure, the audio and video splicing module 103 separates an audio part and a video part in a segment of movie, or a series clip, and divides the video part into several segments (such as: segment A, segment B, segment C, and segment D). A user may run the video recording module 101 of the media information processing apparatus to record some segments (such as the segment A and the segment C) of the video part. After the recording is completed, the network adaptation module 102 automatically pulls other segments (such as the segment B and the segment D) of the video in the movie or the series clip from the background, the audio and video splicing module 103 performs splicing, to generate a complete video (A+B+C+D), and performance of the user is fused into the video, so as to jointly perform performance with a star or another person. Moreover, when the user performs sharing, the uploading module 104 stores performance clips of the user (the segment A and the segment C) in the background. When another user records other clips (the segment B and the segment D), the clips of the user may also be pulled from the background to perform splicing, so as to jointly perform performance.

The user records a video by using a recording system, the video recording module 101 may add subtitles, a filter, a logo, and the like to the video, the network adaptation module 102 records a movie or a series clip according to the user, a clip that the user does not record is automatically downloaded and stored, the audio and video splicing module 103 first splices video clips, and subsequently splices a video and audio, to finish a complete video, the uploading module 104 uploads the video obtained after the splicing and video clips recorded by the user to the background, and the complete video obtained after the splicing is used to be shared with another person, and the clip recorded by the user is used to perform matching and splicing with a clip recorded by another user to form a new video.

Processing Logic

1. The video recording module 101 records a video. The video is recorded by using a camera, and in a recording process, only some clips are recorded. For example, a segment of movie or series is divided into four segments: segment A, segment B, segment C, and segment D, the video recording module 101 records the segment of video A and the segment of video C, and the recorded videos are reserved locally, where neither the segment of video A nor the segment of video C includes a speech part, and subtitles, a logo, and the like may be added to the videos in the recording process.

2. The network adaptation module 102 adapts to a clip.

When the user records the segment of video A and the segment of video C, the network adaptation module 102 informs the background according to a segment of movie or series currently recorded, and a segment that the user records, and the background automatically delivers the segment of video B and the segment of video D (neither of which includes a speech) and a speech of the entire segment of video (A+B+C+D).

3. The audio and video splicing module 103 splices video clips.

When the user completely records the segment of video A and the segment of video C, the segment of video B and the segment of video D are theoretically downloaded completely. In this case, the audio and video splicing module 103 splices the segment of video A, the segment of video B, the segment of video C, and the segment of video D, to complete a segment of complete video without speech.

4. The audio and video splicing module 103 performs video and audio splicing.

After video splicing is completed, the application subsequently performs video and speech splicing at once, to form a complete video. In this case, in the segment of video, there are parts on which the user performs performance: the segment A and the segment C, and there also are the segment of video B and the segment of video D in the television series. Certainly, the segment B and the segment D may alternatively be changed to performance performed by the user, and are not limited to original clips in the movie or television series.

5. The uploading module 104 uploads a video.

As described above, the segment B and the segment D not only may be clips in a series or a movie prepared in advance, but also may be clips of performance performed by another user. Therefore, after completing video recording, the video recording module 101 not only provides the user with a function of locally reserving a video, but also provides the user with a function of uploading a video, and the uploading module 104 uploads the segment A and the segment C recorded by the user, and the complete video (A+B+C+D+speech) to the background. After the complete video (A+B+C+D+speech) is uploaded, an address url for storing the video is returned, and is provided for the user to perform sharing.

6. Sharing.

A video URL is returned in step 5, this video URL can be used to perform some sharing. The sharing may be pure URL sharing, or an H5 web page may be generated to perform sharing, and sharing forms may be diverse.

Step 5 and step 6 in the foregoing processing logic may be implemented according to needs, and are used as only one extended function option for the media information processing apparatus to improve friendly experience.

Figure 14:
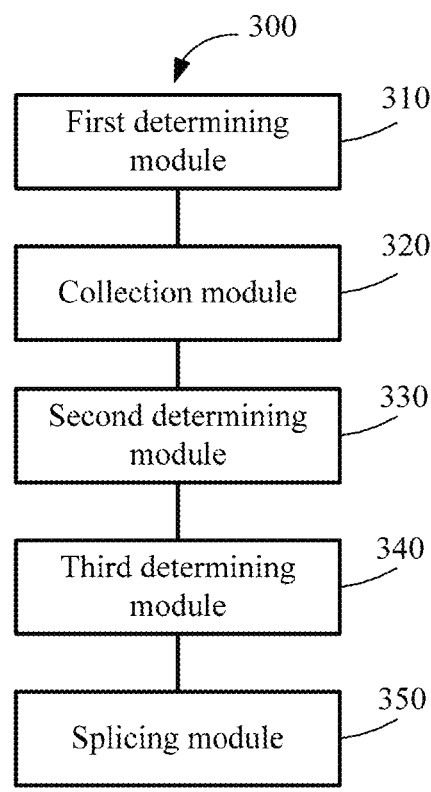
FIG. 14 is a schematic diagram of another optional system structure of a media information processing apparatus according to an embodiment of the present disclosure.

Corresponding to the record of the foregoing embodiment of the present disclosure, another optional system structure for the media information processing apparatus is described. The first apparatus 100 and the second apparatus 200 recorded in the embodiments of the present disclosure may be implemented according to the system architecture of the media information processing apparatus recorded in the embodiments of the present disclosure. Referring to FIG. 14, a media information processing apparatus 300 includes: a first determining module 310, a collection module 320, a second determining module 330, a third determining module 340, and a splicing module 350.

1) First Determining Module 310 and Analysis Module 360

The first determining module 310 determines media information clips of target media information, and characteristics of the media information clips. For example, the characteristics of the media information clips include: identifiers (serial numbers) of the media information clips, time lengths, character roles related to the media information clips, and lines of the character roles.

The analysis module 360 responds to an operation instruction of a first user on media information to obtain the media information clips of the target media information; or the target media information is automatically divided, both video information and audio information in the target media information may be divided during division, video information clips and audio information clips obtained through the division are used to be combined into media information clips, or video information and audio information are separated from the target media information, the audio information is not processed, but the video information is divided to obtain video information clips. To integrate the foregoing division manners, it can be known that a target media information clip has two situations: 1) including the video information and the audio information; and 2) including only the video information.

The analysis module 360 analyzes the target media information to obtain a characteristic of the target media information, and the target media information is divided from the following two dimensions:

dimension 1) representing a time length of the target media information based on the characteristic of the target media information, and dividing the target media information into the media information clips based on a time axis; and dimension 2) representing character roles carried in the target media information based on the characteristic of the target media information, and extracting media information clips including the character roles from the target media information, to obtain the media information clips, where each of the media information clips carries only one of the character roles, and the carried character roles are different. Based on the foregoing different dimensions, in dependence on dividing both the video information and the audio information in the target media information, or dividing only the video information, there correspondingly are the following division manners:

Manner 1) the first determining module 310 performs even (or uneven) division in a division manner based on a time axis, according to a duration time (time length) of the target media information, and in a sequence based on the time axis (including dividing video information and audio information in the target media information, where the video information and the audio information may be obtained from the target media information in advance through separation) to obtain the media information clips, and one media information clip obtained through division includes a video information clip and an audio information clip.

Manner 2) the first determining module 310 represents character roles carried in the target media information based on the characteristic of the target media information, and extracts media information clips including the character roles from the target media information, to obtain the media information clips, where each of the media information clips carries only one of the character roles, and the carried character roles are different.

Manner 3) the first determining module 310 performs even (or uneven) division (only on the video information in the target media information) in a division manner based on a time axis, according to a duration time (time length) of the target media information, and in a sequence based on the time axis to obtain video information clips.

Manner 4) the first determining module 310 separates video information and audio information are from the target media information, the video information is divided based on different character roles carried in the video information, only video information clips carrying different character roles are sequentially extracted from the video information of the target media information, and after the audio information in the target media information is separated from the video information, the audio information is not divided.

2) Collection Module 320

The collection module 320 performs collection on a first user based on the determined characteristics to obtain a first media information clip corresponding to a target media information clip. The collection manner is related to the division manner of the first determining module 310. When the first determining module 310 uses the foregoing manner 1) or manner 2), because a media information clip includes video information and audio information, correspondingly the collection module 320 performs synchronous video and audio collection on performance performed by the first user, and a collected media information clip (the first media information clip) includes video information and audio information. When the first determining module 310 uses the foregoing manner 3) or manner 4), because a media information clip includes only video information, correspondingly the collection module 320 performs only video collection on performance performed by the first user, and a collected media information clip (the first media information clip) includes only video information.

To help the first user choose to imitate the target media information clip to perform performance, the collection module 320 loads the characteristic of the media information clips in the target media information (for example, loads identifiers of the media information clips to be provided for the first user to select); and determines the target media information clip in the media information clips according to a selection operation on the first user. The collection module 320 loads characteristics of the target media information clip (for example, including a collection start moment of the target media information clip, a character role carried in the target media information clip, and corresponding lines) to help the first user perform performance based on the characteristic, and collects performance implemented by the first user based on the characteristic of the target media information clip (including performing video collection and audio collection on the performance performed by the first user).

It may be learned from the foregoing record that, the collection module 320 may select target media information clips from the media information clips in the target media information according to the selection operation of the user, a quantity of the target media information clips is at least one, and correspondingly, a quantity of first media information is at least one.

3) Second Determining Module 330

The second determining module 330 determines media information clips other than the target media information clip in the target media information, and obtains a second media information clip corresponding to the characteristics of the determined media information clips.

Because the second media information clip and the first media information clip that is collected by the collection module 320 are spliced to form media information obtained after the splicing, an information type (such as video information and audio information) included in the second media information clip determined by the second determining module 330 corresponds to the first media information. When the first media information clip collected by the collection module 320 includes video information and audio information, the second media information clip obtained by the second determining module 330 includes video information and audio information. When the first media information clip collected by the collection module 320 includes only video information, the second media information clip obtained by the second determining module 330 also correspondingly includes only video information.

The second determining module 330 obtains each media information clip other than the first media information clip in the target media information as the second media information clip.

Alternatively, the second determining module 330 obtains, based on characteristics of media information clips other than the target media information clip of the media information clips, a media information clip obtained by collecting performance on a second user side as the second media information clip. The second determining module 330 is further configured to obtain the media information clips collected by the second apparatus 200 on the second user side, and perform matching between characteristics of the media information clips collected by the second apparatus 200, and characteristics of media information clips other than the target media information clip in the target media information, and a media information clip that is collected by the second apparatus 200 and on which matching is performed successfully is used as a second media information clip.

In the process in which the collection module 320 collects the first media information clip, the second determining module 330 synchronously obtains second media information other than the first media information clip in the target media information, so as to improve time of manufacturing media information obtained after the splicing, and prevent the first user from waiting for a long time after performing imitation performance on the target media information clip.

4) Third Determining Module 340 and Splicing Module 350

The third determining module 340 determines a splicing manner of the media information clips in the target media information; and the splicing module 350 splices the first media information clip and the second media information clip based on the determined splicing manner, to obtain media information obtained after the splicing.

Corresponding to the foregoing manner 1), when the media information clips of the target media information are obtained through division in a time sequence based on a time axis, the splicing module splices the first media information clip and the second media information clip in a sequence on the time axis in a sequential splicing manner based on the time axis.

Corresponding to the foregoing manner 2), when the media information clips of the target media information are extracted from the target media information based on different character roles carried in the media information clips, the splicing module 350 synchronously splices the first media information clip and the second media information clip based on extraction locations of the carried character roles in the target media information in a synchronous splicing manner.

Corresponding to the foregoing manner 3), when the media information clips of the target media information are obtained through division in a time sequence based on a time axis, the splicing module 350 sequentially splices the audio information (not divided) in the target media information, the first media information clip, and the second media information clip in a sequence based on the time axis in a sequential splicing manner based on the time axis.

Corresponding to the foregoing manner 4), when the media information clips of the target media information are extracted from the target media information based on different character roles carried in the media information clips, the splicing module 350 synchronously splices the audio information, the first media information clip, and the second media information clip based on extraction locations of the carried character roles in the target media information in a synchronous splicing manner.

5) Uploading Module 370 and Sharing Module 380

The uploading module 370 (not shown in FIG. 14, and connected to the splicing module 350) uploads the media information obtained after the splicing to a server side, and obtains a shared link returned by the server side; and the sharing module 380 (not shown in FIG. 14, and connected to the splicing module 350) is configured to respond to a sharing operation instruction of the first user based on the shared link, for example, send the shared link to a terminal device on the second user side having a social attribute associated with that of the first user, so that the second user side views, based on the shared link, the media information obtained after the splicing.

There is corresponding hardware to support function modules of the media information processing apparatus. For example, the first determining module 310, the second determining module 330, the third determining module 340, and the splicing module 350 may be implemented at least by means of cooperation between the processor 110 and the communications module 160 in FIG. 1, and the collection module 320 may be implemented at least by the microphone 130 and the camera 140 shown in FIG. 1.

A person skilled in the art may understand that all or some steps for implementing the foregoing embodiment of the present disclosure may be completed by a program instructing related hardware, the foregoing program may be stored in a computer readable storage medium, and when being executed, the program performs steps including the foregoing method embodiment. The foregoing storage medium includes: any medium that can store program code, such as a removable storage apparatus, a random access memory (RAM, Random Access Memory), a read-only memory (ROM, Read-Only Memory), a magnetic disk, or an optical disc.

Additionally, when the integrated unit of the present disclosure is implemented in a form of a software functional module and sold or used as an independent product, the integrated unit may be stored in a computer-readable storage medium. Based on such an understanding, the technical solutions of the embodiments of the present disclosure essentially, or the part contributing to the related technology may be implemented in a form of a software product. The computer software product is stored in a storage medium and includes several instructions for instructing a computer apparatus (which may be a personal computer, a server, a network apparatus, or the like) to perform all or some of the methods described in the embodiments of the present disclosure. The foregoing storage medium includes: any media that can store program code, such as a removable storage apparatus, a RAM, a ROM, a magnetic disk, or an optical disc.

To sum up, in the embodiments of the present disclosure, by using a characteristic of a media information clip on which a first user intends to perform performance, the first user is supported to perform imitation performance on a target media information clip, and the first user may perform imitation performance without memorizing all characteristics (such as lines) of the target media information clip; and after the media information clip is determined, based on a characteristic of a media information clip on which the first user does not perform imitation performance, a media information clip that needs to be spliced to the media information clip on which the first user imitates the target media information clip to perform performance is obtained. The entire process does not need to any operation of the first user. The first user only needs to perform imitation performance on the target media information clip, and complete media information may be obtained subsequently, so as to resolve a problem that the complete media information cannot be generated because the first user cannot operate a professional media editing software, thereby improving media information processing efficiency.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the appended claims.

What is claimed is:

1. A media information processing method performed at a computer system having one or more processors and memory storing a plurality of programs to be executed by the one or more processors, the method comprising:
    identifying target media information, wherein the target media information includes a plurality of character roles;
    dividing the target media information into a plurality of media information clips based on character roles carried in the target media information, wherein each of the media information clips includes a plurality of frames of images and each of the media information clips carries only one of the character roles;
    for each of the media information clips, extracting respective frames of images and audio information corresponding in time with the respective frames, wherein the extracting includes, for a frame of image that includes more than one character role, extracting a part of the frame such that the part includes only one of the character roles;
    receiving a user selection of a first media information clip of the plurality of media information clips from a first user, the first media information clip corresponding to a target character role of the plurality of character roles;
    in response to the user selection:
        loading characteristics of the first media information clip, the characteristics including: a start time of the first media information clip, an end time of the first media information clip, and lines of the target character at respective times of the first media information clip;
        performing collection on the first user based on the characteristics;
        generating a first imitation performance clip of the first user based on the characteristics, the first imitation performance clip being used for replacing the first media information clip in which the target character appears;
    determining media information clips other than the first media information clip in the target media information;
    determining a splicing manner of the media information clips in the target media information;
    splicing the first imitation performance clip and the other media information clips based on the determined splicing manner to form a complete video; and
    generating a video link for the first user to enable sharing of the complete video.

2. The method according to claim 1, further comprising:
    receiving a selection of a second media information clip of the plurality of media information clips from the first user, the second media information clip corresponding to the target character role;
    loading second characteristics of the second media information clip;
    performing collection on the first user based on the second characteristics; and
    generating a second imitation performance clip based on the second characteristics, wherein the second imitation performance clip is used to replace the second media information clip in which the target character appears;
    wherein the splicing further comprises splicing the second imitation performance clip with the first imitation performance clip and the other media information clips based on the determined splicing manner.

3. The method according to claim 2, wherein the splicing the second imitation performance clip with the first imitation performance clip and the other media information clips based on the determined splicing manner comprises:
    sequentially splicing, when the media information clips of the target media information are obtained through division in a time sequence based on a time axis, the audio information, the first imitation performance clip, and the second imitation performance clip in a sequence based on the time axis in a sequential splicing manner based on the time axis; and
    synchronously splicing, when the media information clips of the target media information are extracted from the target media information based on different character roles carried in the media information clips, the audio information, the first imitation performance clip, and the second imitation performance clip based on extraction locations of the carried character roles in the target media information in a synchronous splicing manner.

4. The method according to claim 1, further comprising:
    receiving selection of a third imitation performance clip of the target media information by the first user, wherein the third imitation performance clip is performed by a second user and uploaded onto the computer system, the third imitation performance clip is used to replace a third media information clip in which another target character appears, and the second user has a social relationship with the first user; and splicing the first imitation performance clip, the third imitation performance clip, and and the other media information clips based on the determined splicing manner; and wherein the enable sharing of the complete video includes sharing the video link with the second user.

5. The method according to claim 1, further comprising:
analyzing the target media information to obtain a characteristic of the target media information, and performing at least one of the following division operations:
representing a time length of the target media information based on the characteristic of the target media information, and dividing the target media information into the media information clips based on a time axis; and
representing character roles carried in the target media information based on the characteristic of the target media information, and extracting media information clips comprising the character roles from the target media information, to obtain the media information clips, wherein each of the media information clips carries only one of the character roles, and the carried character roles are different.

6. The method according to claim 1, wherein generating a video link for the first user to enable sharing of the complete video comprises:
after the splicing, uploading the completed video to a server side, and obtaining a shared link returned by the server side; and
responding to a sharing operation instruction of the first user based on the shared link.

7. A media information processing apparatus comprising one or more processors, memory coupled to the one or more processors, and a plurality of programs stored in the memory that, when executed by the one or more processors, cause the media information processing apparatus to perform operations including:
identifying target media information, wherein the target media information includes a plurality of character roles;
dividing the target media information into a plurality of media information clips based on character roles carried in the target media information, wherein each of the media information clips includes a plurality of frames of images and each of the media information clips carries only one of the character roles;
for each of the media information clips, extracting respective frames of images and audio information corresponding in time with the respective frames, wherein the extracting includes, for a frame of image that includes more than one character role, extracting a part of the frame such that the part includes only one of the character roles;
receiving a selection of a first media information clip of the plurality of media information clips from a first user, the first media information clip corresponding to a target character role of the plurality of character roles;
in response to the user selection:
loading characteristics of the first media information clip, the characteristics including: a start time of the first media information clip, an end time of the first media information clip, and lines of the target character at respective times of the first media information clip;
performing collection on the user based on the characteristics;
generating a first imitation performance clip of the first user based on the characteristics, the imitation performance clip being used for replacing the first media information clip in which the target character appears;
determining media information clips other than the first media information clip in the target media information;
determining a splicing manner of the media information clips in the target media information;
splicing the first imitation performance clip and the other media information clips based on the determined splicing manner to form a complete video; and
generating a video link for the user to enable sharing of the complete video.

8. The media information processing apparatus according to claim 7, further comprising:
receiving a selection of a second media information clip of the plurality of media information clips from the first user, the second media information clip corresponding to the target character role;
loading second characteristics of the second media information clip;
performing collection on the first user based on the second characteristics; and
generating a second imitation performance clip based on the second characteristics, wherein the second imitation performance clip is used to replace the second media information clip in which the target character appears;
wherein the splicing further comprises splicing the second imitation performance clip with the first imitation performance clip and the other media information clips based on the determined splicing manner.

9. The media information processing apparatus according to claim 8, wherein the splicing the second imitation performance clip with the first imitation performance clip and the other media information clips based on the determined splicing manner comprises:
sequentially splicing, when the media information clips of the target media information are obtained through division in a time sequence based on a time axis, the audio information, the first imitation performance clip, and the second imitation performance clip in a sequence based on the time axis in a sequential splicing manner based on the time axis; and
synchronously splicing, when the media information clips of the target media information are extracted from the target media information based on different character roles carried in the media information clips, the audio information, the first imitation performance clip, and the second imitation performance clip based on extraction locations of the carried character roles in the target media information in a synchronous splicing manner.

10. The media information processing apparatus according to claim 7, further comprising:
receiving selection of a third imitation performance clip of the target media information by the first user, wherein the third imitation performance clip is performed by a second user and uploaded onto the computer system, the third imitation performance clip is used to replace a third media information clip in which another target character appears, and the second user has a social relationship with the first user; and splicing the first imitation performance clip, the third imitation performance clip, and and the other media information clips based on the determined splicing manner; and wherein the enable sharing of the complete video includes sharing the video link with the second user.

11. The media information processing apparatus according to claim 7, wherein the operations further comprise:

analyzing the target media information to obtain a characteristic of the target media information, and performing at least one of the following division operations:

representing a time length of the target media information based on the characteristic of the target media information, and dividing the target media information into the media information clips based on a time axis; and representing character roles carried in the target media information based on the characteristic of the target media information, and extracting media information clips comprising the character roles from the target media information, to obtain the media information clips, wherein each of the media information clips carries only one of the character roles, and the carried character roles are different.

12. The media information processing apparatus according to claim 7, wherein generating a video link for the first user to enable sharing of the complete video further comprises:

after the splicing, uploading the completed video to a server side, and obtaining a shared link returned by the server side; and responding to a sharing operation instruction of the first user based on the shared link.

13. A non-transitory computer readable storage medium storing a plurality of programs that, when executed by one or more processors of a media information processing apparatus, cause the media information processing apparatus to:

identify target media information, wherein the target media information includes a plurality of character roles;

divide the target media information into a plurality of media information clips based on character roles carried in the target media information, wherein each of the media information clips includes a plurality of frames of images and each of the media information clips carries only one of the character roles;

for each of the media information clips, extract respective frames of images and audio information corresponding in time with the respective frames, wherein the extraction includes, for a frame of image that includes more than one character role, extract a part of the frame such that the part includes only one of the character roles;

receive a user selection of a first media information clip of the plurality of media information clips from a first user, the first media information clip corresponding to a target character role of the plurality of character roles;

in response to the user selection:

load characteristics of the first media information clip, the characteristics including: a start time of the first media information clip, an end time of the first media information clip, and lines of the target character at respective times of the first media information clip;

perform collection on the user based on the characteristics;

generate a first imitation performance clip of the first user based on the characteristics, the first imitation performance clip being used for replacing the first media information clip in which the target character appears;

determine media information clips other than the first media information clip in the target media information;

determine a splicing manner of the media information clips in the target media information;

splice the first imitation performance clip and the other media information clips based on the determined splicing manner to form a complete video; and generate a video link for the first user to enable sharing of the complete video.

14. The non-transitory computer readable storage medium according to claim 13, wherein the media information processing apparatus is configured to:

receive a selection of a second media information clip of the plurality of media information clips from the first user, the second media information clip corresponding to the target character role;

load second characteristics of the second media information clip;

perform collection on the first user based on the second characteristics; and generate a second imitation performance clip based on the second characteristics, wherein the second imitation performance clip is used to replace the second media information clip in which the target character appears;

wherein the splicing further comprises splicing the second imitation performance clip with the first imitation performance clip and the other media information clips based on the determined splicing manner.

15. The non-transitory computer readable storage medium according to claim 14, wherein the media information processing apparatus is configured to:

sequentially splice, when the media information clips of the target media information are obtained through division in a time sequence based on a time axis, the audio information, the first imitation performance clip, and the second imitation performance clip in a sequence based on the time axis in a sequential splicing manner based on the time axis; and synchronously splice, when the media information clips of the target media information are extracted from the target media information based on different character roles carried in the media information clips, the audio information, the first imitation performance clip, and the second imitation performance clip based on extraction locations of the carried character roles in the target media information in a synchronous splicing manner.

16. The non-transitory computer readable storage medium according to claim 13, wherein the media information processing apparatus is configured to:

receive selection of a third imitation performance clip of the target media information by the first user, wherein the third imitation performance clip is performed by a second user and uploaded onto the computer system, the third imitation performance clip is used to replace a third media information clip in which another target character appears, and the second user has a social relationship with the first user; and splice the first imitation performance clip, the third imitation performance clip, and and the other media information clips based on the determined splicing manner; and wherein the enable sharing of the complete video includes sharing the video link with the second user.

17. The non-transitory computer readable storage medium according to claim 13, wherein the media information processing apparatus is configured to:
- analyze the target media information to obtain a characteristic of the target media information, and perform at least one of the following division operations:
- represent a time length of the target media information based on the characteristic of the target media information, and dividing the target media information into the media information clips based on a time axis; and
- represent character roles carried in the target media information based on the characteristic of the target media information, and extracting media information clips comprising the character roles from the target media information, to obtain the media information clips, wherein each of the media information clips carries only one of the character roles, and the carried character roles are different.

* * * * *